(12) United States Patent
Brady

(10) Patent No.: US 11,828,735 B2
(45) Date of Patent: Nov. 28, 2023

(54) ASSEMBLY AND METHOD FOR PRESSURE TESTING

(71) Applicant: Dana Patrick Brady, El Mirage, AZ (US)

(72) Inventor: Dana Patrick Brady, El Mirage, AZ (US)

( * ) Notice: Subject to any disclaimer, the term of this patent is extended or adjusted under 35 U.S.C. 154(b) by 94 days.

(21) Appl. No.: 17/740,694

(22) Filed: May 10, 2022

(65) Prior Publication Data

US 2022/0357254 A1 Nov. 10, 2022

Related U.S. Application Data

(60) Provisional application No. 63/186,619, filed on May 10, 2021.

(51) Int. Cl.
| | |
|---|---|
| *G01N 3/12* | (2006.01) |
| *G01M 3/02* | (2006.01) |
| *G01M 5/00* | (2006.01) |
| *F16K 31/06* | (2006.01) |
| *G01M 13/00* | (2019.01) |
| *F16K 37/00* | (2006.01) |

(52) U.S. Cl.
CPC ............... *G01N 3/12* (2013.01); *F16K 31/06* (2013.01); *F16K 37/0091* (2013.01); *G01M 13/00* (2013.01); *G01N 2203/0048* (2013.01)

(58) Field of Classification Search
CPC .... G01M 3/329; G01M 17/08; G01M 3/3263; G01M 3/007; G01M 13/00; G01R 31/006; B60L 3/0046; B60C 23/00354; F15B 19/005; F17C 13/025; B60R 25/08; F02M 25/0836; B60T 11/108; B60T 17/22; A62C 31/005; B67D 7/365; A62B 27/00; B64F 1/28; B60G 17/0152; G01G 19/10; G01N 3/12; G01N 2203/0048; F16K 31/06; F16K 37/0091
See application file for complete search history.

(56) References Cited

U.S. PATENT DOCUMENTS

| | | | |
|---|---|---|---|
| 11,312,644 B1* | 4/2022 | Lynn .......................... | C02F 1/78 |
| 2009/0009304 A1* | 1/2009 | Lacasse ............... | G01R 31/006 |
| | | | 340/431 |
| 2009/0314581 A1* | 12/2009 | Whitney Reed .......... | F16N 7/38 |
| | | | 184/54 |

* cited by examiner

*Primary Examiner* — Brandi N Hopkins
(74) *Attorney, Agent, or Firm* — Barry Choobin; Patent 360

(57) ABSTRACT

An assembly for pressure testing of components, such as a valve of an HVAC system. The assembly includes a hand truck, a tank and a housing mounted on the base of the hand truck. A control unit is encased within the housing and coupled to a solenoid, wherein the solenoid is coupled to a valve. The valve connects a pressure regulator of the tank to the component. The control unit can receive instruction from an external device at a safe distance from the assembly, and upon receiving the instruction, the control unit can actuate the solenoid to open the valve.

17 Claims, 5 Drawing Sheets

ASSEMBLY AND METHOD FOR PRESSURE TESTING

CROSS-REFERENCE TO RELATED APPLICATIONS

This application claims priority to the U.S. provisional patent application Ser. No. 63/186,619, filed on May 10, 2021, which is incorporated herein by reference in its entirety.

FIELD OF INVENTION

The present relates to an assembly and method for pressure testing, and more particularly, the present invention relates to an assembly and method for remote pressure testing.

BACKGROUND

Pressure testing is a standard procedure for testing the integrity of new, old, and repaired high-pressure components, such as tanks, valves, compressors, radiators, pipes, and the like. Generally, pressure is applied to induce normal stress levels in a component to check for strength, leakage, and the like. Pressure testing is generally performed after repairs to HVAC systems for checking any leaks and to ensure proper functioning. However, performing high-pressure testing is time-consuming, risky, and cost-prohibitive. In pressure testing of a component, there is always a risk of accidents such as removal of hose, blast, and the like.

A need is therefore appreciated for a system and method for making the process of pressure testing safe and faster.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an assembly and method of pressure testing that is safe for the operators.

It is another object of the present invention that the handing of the assembly is easier, safe, and less laborious.

It is still another object of the present invention that the chances of injury to the operators can be significantly reduced.

It is yet another object of the present invention that the parameters of the pressure testing procedure can be recorded.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an", and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Figure 1:
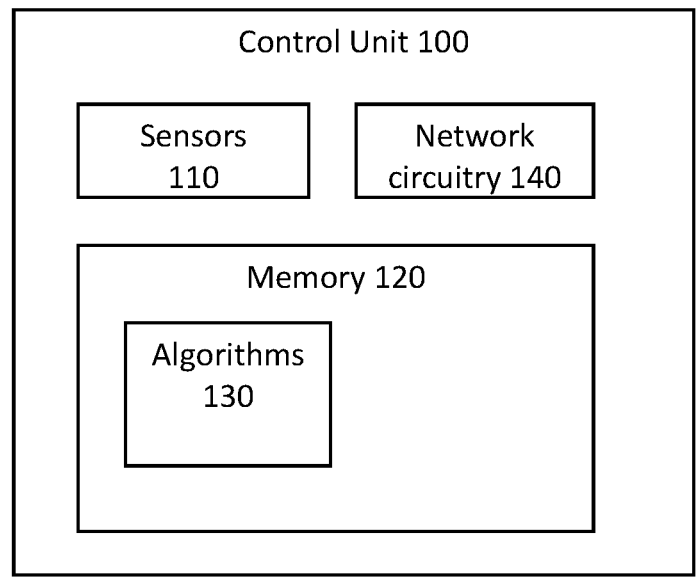
FIG. 1 is a block diagram of the control unit of the disclosed assembly, according to an exemplary embodiment of the present invention.

Disclosed is a system and method for safe pressure testing of components/articles for any leaks. The disclosed system allows an operator to control the disclosed system for pressure testing from a safer area that may be at a sufficient distance away from the testing area to prevent any harm to the operator in case of an accident. Referring to FIG. 1 is a block diagram of a control unit 100 of the disclosed assembly. The control unit 100 can be connected to different components of the assembly for controlling and operating the different components. The control unit can include sensors 110 to monitor the testing procedure such as the pressure sensors. The control unit can receive readings from the different sensors. Examples of the sensors include sound sensors that can detect very small sounds, such as micro leaks. The control unit 100 can include a memory 120 for storing algorithms 130, such as sound processing algorithms that can differentiate between sounds, remove noise, amplify the sounds, and digitally present the changes in sound levels graphically on a display. The sensor can be a vibration sensor that can detect vibrations in an object. The disclosed control unit can receive readings from the vibration sensor. The control unit can include a suitable vibration analysis algorithm that can differentiate vibrations from different sources and can digitally present the vibrations on a display in a graphical form for analysis.

Figure 2:
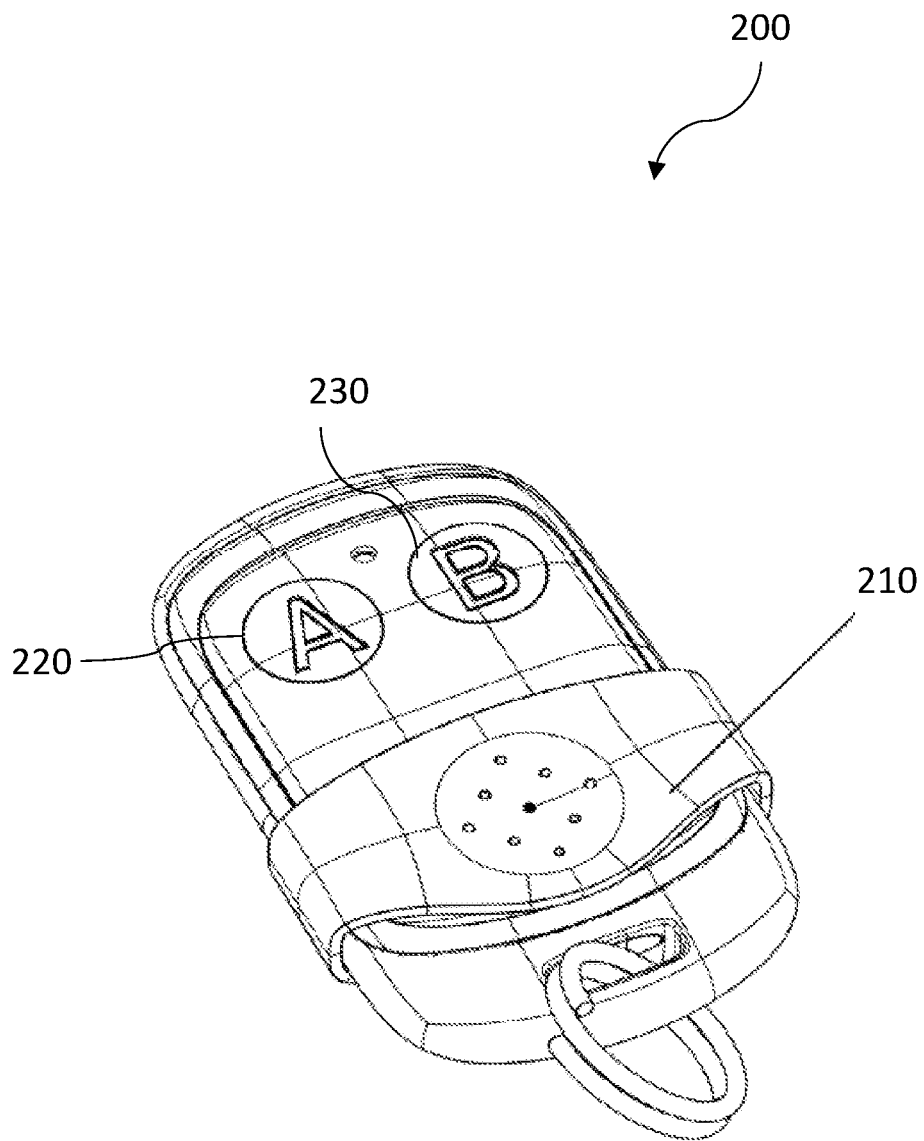
FIG. 2 is a perspective view of the disclosed assembly, according to an exemplary embodiment of the present invention.

The control unit 100 can also include a network circuitry 140 for connecting to one or more external devices through a network. The network can be wired or wireless. Examples of wireless networks include Bluetooth™ and Wi-Fi. FIG. 2 shows a fob 200 as an external device that includes a microcontroller 210, an ON button 220, and an OFF button 230. The control unit 100 can receive instructions from the external device and transmit information to the external device. The external device can be a smartphone, laptop, workstation, tablet computer, and the like. The external device can include at least a display to view information received from the control unit. The external device can also be a fob 200 as shown in FIG. 2 that includes two or more buttons. The ON button 220 can be used to pressurize the system and the Off button 230 can be used to depressurize the system. In one implementation, the control unit 100 can connect to a smartphone or similar device to present information on the display of the smartphone and can also connect to the fob to receive On and Off instructions from the fob. The fob can include an embedded microcontroller 210.

Figure 3:
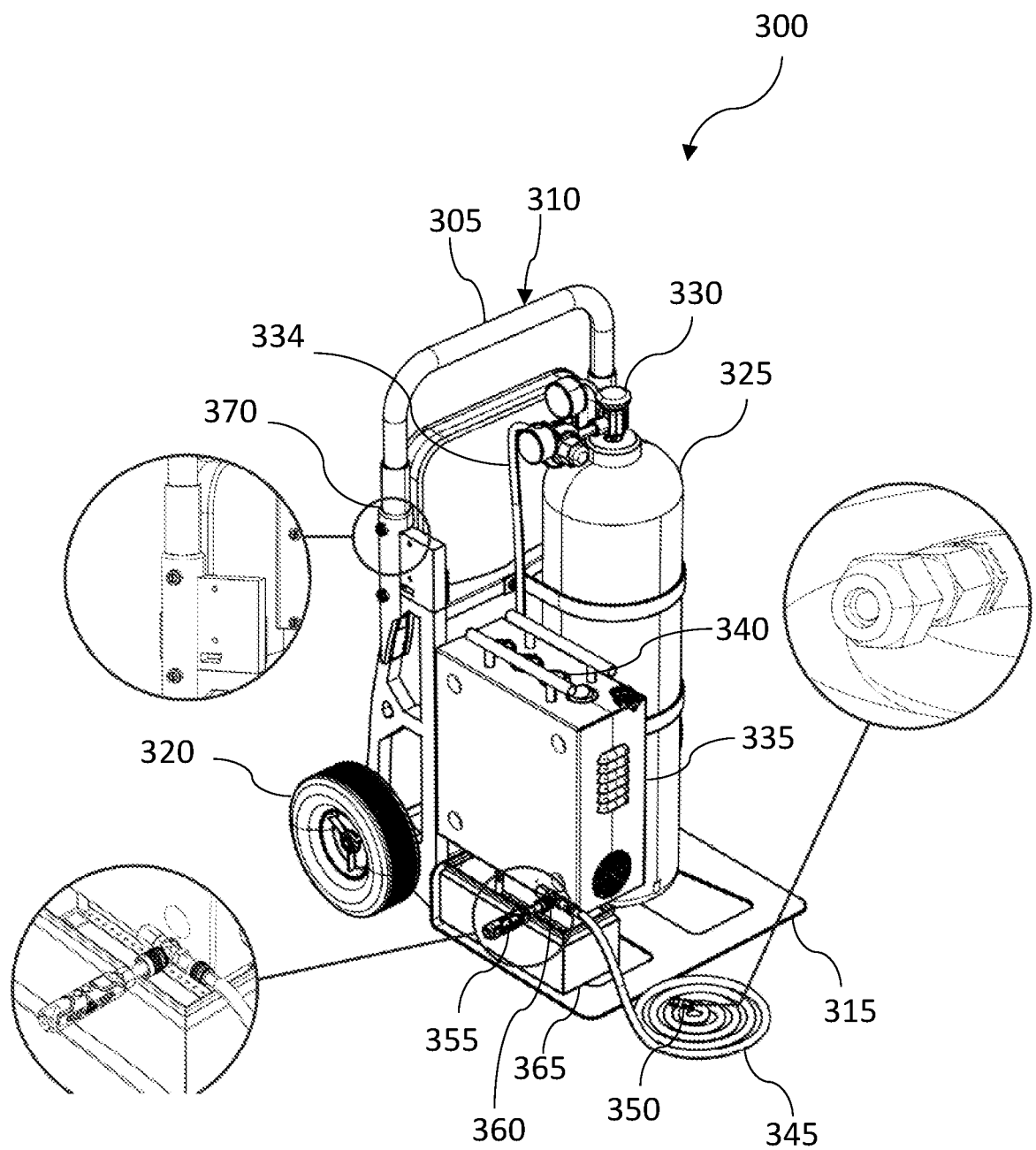
FIG. 3 is a front view of the disclosed assembly, according to an exemplary embodiment of the present invention.
Figure 4:
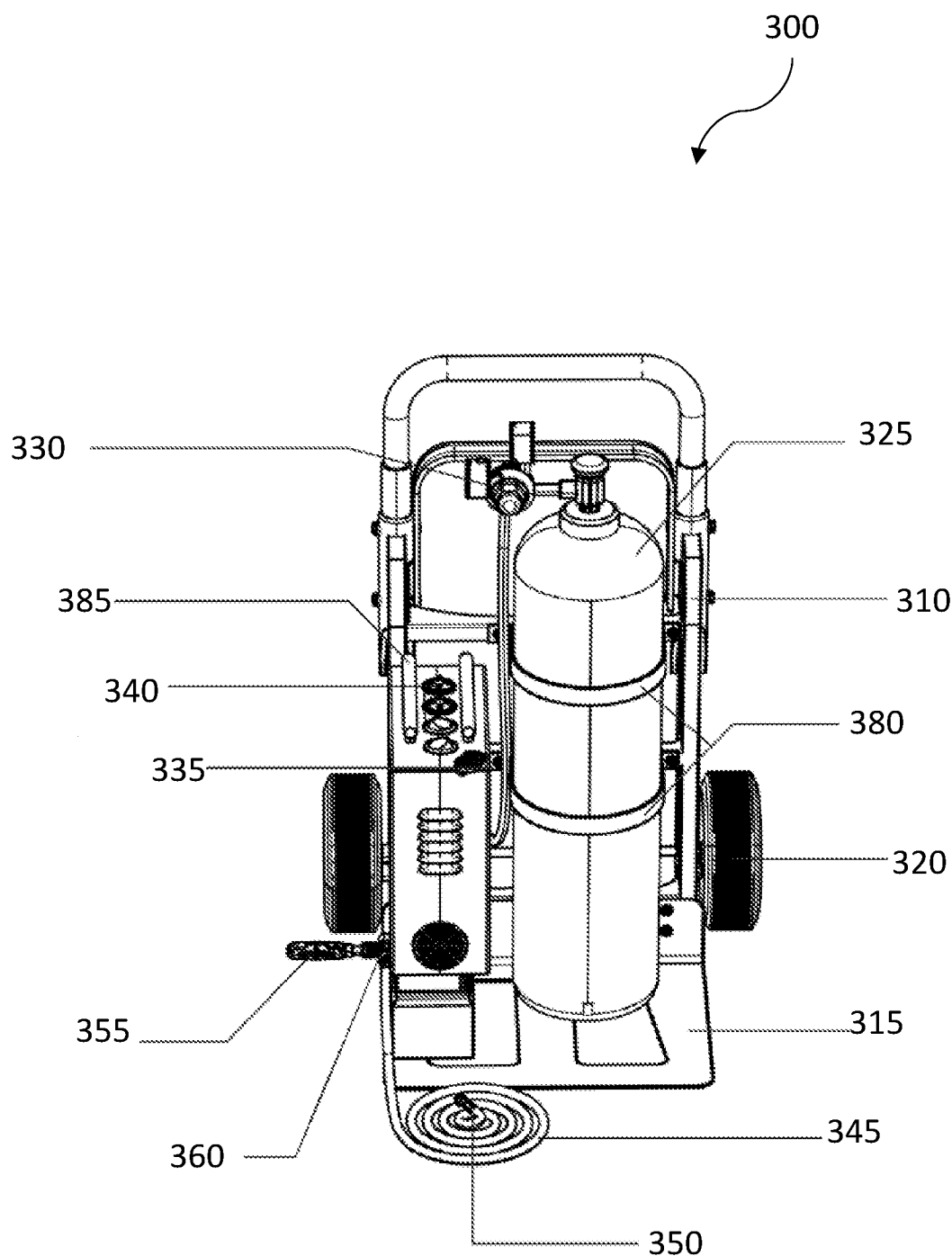
FIG. 4 shows a fob as an external device, according to an exemplary embodiment of the present invention.
Figure 5:
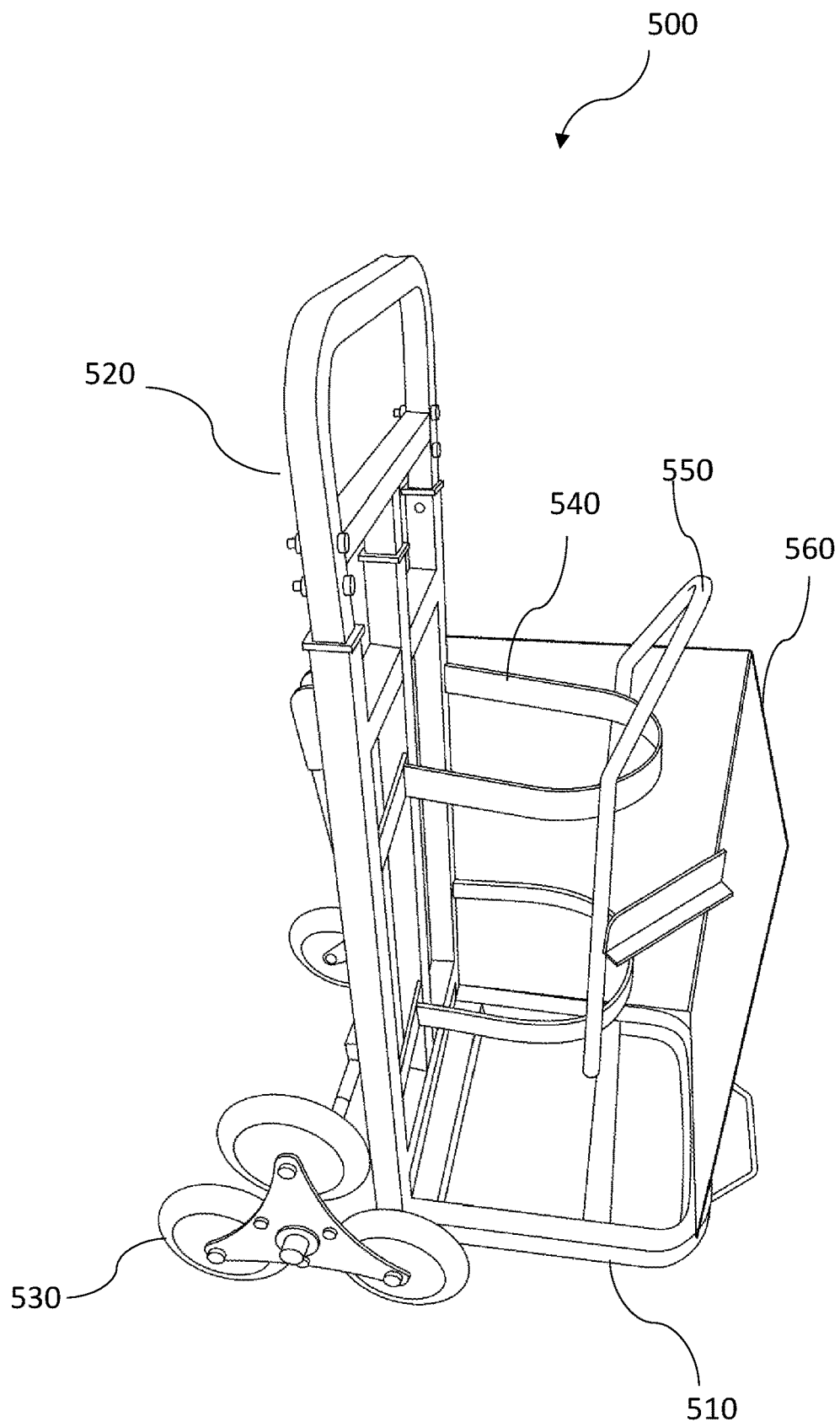
FIG. 5 shows a hand truck of the assembly, according to an exemplary embodiment of the present invention.

Referring to FIGS. 3 and 4 which show an exemplary embodiment of the disclosed assembly 300. The assembly 300 can include a hand truck 305 that includes at least a rear wall 310, a base 315, and wheels 320. The rear wall can include telescopic handles that can be increased or decreased in length. The hand truck 305 can further include a suitable breaking mechanism that keeps the hand truck stable and stationary during use without any external support. Another embodiment of the hand truck is shown in FIG. 5, the hand truck 500 includes a base 510, a handle 520, and a wheel assembly 530. The wheel assembly 530 includes two units of three wheels each, wherein the two units can rotate between predefined steps. The hand truck 500 can further include straps 540 for immobilizing a gas cylinder supported on the base 510. FIG. 3 shows the gas tank 325 positioned on the hand truck 305. The hand truck can also include a shield 560 to cover the lower tank portion supported on the base. The hand truck can be made from a rigid and durable material such as metal. The straps and the shield can be made of the same or different material without departing from the scope of the present invention. The shield and straps can be optional, for example, external straps can be used to immobilize the tank on the hand truck.

Again, refer to FIG. 3, which shows a tank 325 mounted to a base 315 of the hand truck. The tank can include air or any gas, such as nitrogen. A pressure regulator 330 that includes pressure gauges is mounted to the mouth of the tank. The working of the tank and the pressure regulator is known in the art, and any such tank and pressure regulator known in the art is within the scope of the present invention, including the tanks of different capacities. A housing 335 can also be seen mounted to the base of the hand truck. The housing can encase the control unit, a transducer, a valve, a solenoid, a battery, circuitry, and the like of the disclosed assembly 300. A control panel 340 can be mounted to the housing and can include different buttons or controls for controlling the different parameters of the control unit. The control panel can include an on and off switch, a pressure regulator switch, and the like. The disclosed assembly can be powered by a portable battery that can also be housed in the housing. The housing can also enclose a pneumatic air valve, such as a 400 PSI pneumatic air valve. The valve can be connected to the pressure regulator of the tank through a high-pressure hose 335. A solenoid, also enclosed with the housing can be operably coupled to the valve for opening and closing the valve. Another high-pressure hose 345 can connect the valve to the input port of the component being pressure testing. A coupling 350 can be provided to an end of the high-pressure hose 345, the coupling 350 can be used to connect the high-pressure hose 345 to the component. A pressure measuring instrument 355 can be connected using a high-pressure connector 360 for measuring the pressure. Also, the hand truck can have a telescoping mechanism 370 for the handle that allows the handle to be pulled to increase the overall height of the handle.

The housing can also incorporate a storage compartment 365 for storing small items. The storage compartment can be in the form of a drawer. Alternatively, the storage compartment can have a box and cover. Straps 380 of the hand truck can allow immobilizing the tank on the hand truck. The housing 335 can include two handles 385 that can be used to pull out the housing 335 from the hand truck.

In use, an operator can move the disclosed assembly nearby the component to be tested. The hose, through the coupling, can be connected to the component based on the design of the component. Once connected, the required pressure can be set in the pressure regulator by the operator. Alternatively, the pressure can also be set remotely through an external device. Sensors can also be attached to the component for taking measurements. The assembly can remain in a standby mode and unpressurized. The operator can then move to a safe area. Once the operator is at a sufficient distance from the assembly, using the external device, the operator can turn the system on to pressurize the component. The control unit can receive readings from the different sensors during the process which includes pressurizing, monitoring, and depressurizing. The readings can be received on the external device from the control unit in near real-time for analysis. On the external device, an interface can be provided for interacting with the disclosed assembly.

The operator can monitor that process on the external device for any defects in the component being tested. Once checked, the assembly can be depressurized by sending an instruction from the external device. Thus, the operator is at a safe distance from the testing area and protected from any injury that may be caused by any accident during the testing procedure. The whole equipment is assembled on the hand truck, which makes carrying the disclosed assembly to a testing site easy, without any hard labor, and without any risk of injury due to handling heavy equipment.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An assembly for pressure testing, the assembly comprises:
 a hand truck that has a base, an upstanding rear wall, a plurality of straps extending from the rear wall and configured to immobilize a tank positioned on the base, a handle extends from a top of the rear wall, a plurality of wheels coupled to the base of the hand truck;
 a housing mounted to the base of the hand truck;
 a valve encased in the housing and coupled to a pressure regulator of the tank through a first hose;
 a solenoid operably coupled to the valve and configured to be actuated for opening and closing the valve;
 a second hose coupled to the valve, a free end of the second hose has a coupler for connecting the second hose to an input of a component for pressure testing of the component; and
 a control unit operably coupled to the solenoid and configured to actuate the solenoid, wherein the control unit is configured to receive instructions from an external device at a predefined distance from the assembly for actuating the solenoid, the control unit encased within the housing.

2. The assembly according to claim 1, wherein the external device is a fob, the fob has an ON button and an OFF button.

3. The assembly according to claim 1, wherein the external device is a smartphone, the control unit is configured to present data on the smartphone, and the data comprises pressure readings.

4. The assembly according to claim 3, wherein the assembly further comprises a pressure sensor configured to detect pressure in the component.

5. The assembly according to claim 1, wherein the housing further comprises a storage compartment.

6. The assembly according to claim 1, wherein the hand truck further comprises a braking mechanism for keeping the assembly stationary during use.

7. The assembly according to claim 1, wherein the handle is a telescoping handle.

8. The assembly according to claim 1, wherein the assembly further comprises a battery encased within the housing.

9. A method for safe pressure testing of a component, the method comprising the steps of:
 providing an assembly for pressure testing, the assembly comprises:
  a hand truck that has a base, an upstanding rear wall, a plurality of straps extending from the rear wall and configured to immobilize a tank positioned on the base, a handle extends from a top of the rear wall, a plurality of wheels coupled to the base of the hand truck,
  a housing mounted to the base of the hand truck,
  a valve encased in the housing and coupled to a pressure regulator of the tank through a first hose,
  a solenoid operably coupled to the valve and configured to be actuated for opening and closing the valve,
  a second hose coupled to the valve, a free end of the second hose has a coupler for connecting the second hose to an input of the component for pressure testing of the component, and
  a control unit operably coupled to the solenoid and configured to actuate the solenoid, wherein the control unit is configured to receive instructions from an external device at a predetermined distance from the assembly for actuating the solenoid, the control unit encased within the housing;
 upon connecting the coupler to the input of the component, moving away from the assembly up to the predetermined distance; and
 actuating the solenoid resulting in opening of the valve and pressurizing of the component.

10. The method according to claim 9, wherein the external device is a fob, the fob has an ON button and an OFF button.

11. The method according to claim 9, wherein the external device is a smartphone, the control unit is configured to present data on the smartphone, and the data comprises pressure readings.

12. The method according to claim 11, wherein the assembly further comprises a pressure sensor configured to detect pressure in the component.

13. The method according to claim 9, wherein the housing further comprises a storage compartment.

14. The method according to claim 9, wherein the component is a valve of an HVAC unit.

15. The method according to claim 9, wherein the hand truck further comprises a braking mechanism for keeping the assembly stationary during use.

16. The method according to claim 9, wherein the handle is a telescoping handle.

17. The method according to claim 9, wherein the assembly further comprises a battery encased within the housing.

* * * * *